(12) United States Patent
Deuchar Care

(10) Patent No.: US 8,779,022 B2
(45) Date of Patent: Jul. 15, 2014

(54) POLYMER COMPONENTS

(75) Inventor: Ian Colin Deuchar Care, Derby (GB)

(73) Assignee: Rolls-Royce PLC (GB)

( * ) Notice: Subject to any disclaimer, the term of this patent is extended or adjusted under 35 U.S.C. 154(b) by 916 days.

(21) Appl. No.: 12/131,949

(22) Filed: Jun. 3, 2008

(65) Prior Publication Data

US 2008/0306177 A1    Dec. 11, 2008

(30) Foreign Application Priority Data

Jun. 9, 2007    (GB) .................................. 0711120.6

(51) Int. Cl.
  *B29C 71/04*    (2006.01)
  *C08F 2/50*    (2006.01)
  *G09F 13/00*    (2006.01)

(52) U.S. Cl.
  USPC .................................. 522/71; 522/46; 40/547

(58) Field of Classification Search
  USPC ......................................... 522/71, 46; 40/547
  See application file for complete search history.

(56) References Cited

U.S. PATENT DOCUMENTS

| | | | |
|---|---|---|---|
| 5,198,479 A * | 3/1993 | Shiobara et al. | 523/214 |
| 5,259,055 A | 11/1993 | Cowen et al. | |
| 6,195,486 B1 | 2/2001 | Field et al. | |
| 6,208,790 B1 | 3/2001 | Zopf et al. | |
| 2004/0021255 A1 | 2/2004 | Bilanin et al. | |
| 2004/0032748 A1 * | 2/2004 | Trudeau et al. | 362/554 |
| 2006/0024482 A1 * | 2/2006 | Stachurski et al. | 428/292.1 |

FOREIGN PATENT DOCUMENTS

| | | |
|---|---|---|
| EP | 0576266 A3 | 12/1993 |
| GB | 2423279 | 8/2006 |

* cited by examiner

*Primary Examiner* — Peter F Godenschwager
*Assistant Examiner* — Jessica Roswell
(74) *Attorney, Agent, or Firm* — McCormick, Paulding & Huber LLP

(57) ABSTRACT

Conventional curable polymers tend to shrink upon curing whilst low shrinkage ultraviolet light curing polymers have a problem with respect to curing below surface areas of a component. By providing light transmitting elements and/or local ultraviolet light source precursors, greater depth of ultraviolet curing can be achieved and therefore enhanced acceptability with regard to component manufacture. The light transmitting elements may be formed by optic fibers or coatings to existing reinforcing fibers or through consideration of the refractive index of the cured and uncured polymer to create light transmission paths through the component. Ultraviolet light source precursors can be activated by heat or a "seed" light exposure or vibration to create localised ultraviolet curing of the polymer thereabout.

22 Claims, 1 Drawing Sheet

POLYMER COMPONENTS

CROSS REFERENCE TO RELATED APPLICATION

This application is entitled to the benefit of British Patent Application No. GB 0711120.6 filed on Jun. 9, 2007.

FIELD OF THE INVENTION

The present invention relates to polymer components and more particularly to polymer components utilizing ultraviolet curable polymers and resins.

BACKGROUND OF THE INVENTION

It is known to form components utilizing polymers and in particular curable polymers in a wide number of industries and in relation to a wide range of components. Traditionally, other than with regard to thin components, the normal techniques for producing a cured polymer component is either through a two part solvent based or resin based polymer curing process or through use of heat to activate curing of the polymer.

With regard to the solvent and two part processes, activation is typically achieved through a lay up of the solvent based or two part (resin and hardener) polymer combinations within a mould and then heat in applied to activate and accelerate the curing procedure until a desired finished component structure is achieved. Other techniques as indicated to stimulate curing of polymers include simply applying heat possibly delivered through an external source such as within an oven or utilizing infrared heat or utilizing dyes or selected filters within the resin to react with light or heating with microwaves or applying electric current to conductive fibers including carbon fibers to generate heat or chemical reaction heat or utilizing a trigger catalyst which may be triggered by a particular frequency of light. There are also chemical methods, which may delay the curing process to allow assembly of uncured components before the curing reaction completes. Finally, it is also known to coat reinforcing fibers with a catalyst, which again will start curing when combined with the polymer or resin.

A particular problem with such traditionally chemical or heat curing is that, during the curing process, the fiber reinforced polymer shrinks. Shrinkage is usually restrained by fiber stiffness and also by mould shape where applicable. Shrinkage is as a result of molecular changes in the polymer as it changes from an amorphous liquid to a more stabilized solid and also, particularly when solvents are used release of volatiles from the cured polymer. It will also be understood that the curing process is often performed at elevated temperatures and in any event the curing process itself may be exothermic that is to say releases further heat as a result of the molecular changes. In such circumstances as the component cures and then cools residual tensile stresses build up within the component leading to particularly compressive residual stresses at the surface and within the fibers. The tensile residual stresses can lead to matrix cracking and leave the components susceptible to early tensile or fatigue failure. It will be understood that the fibers are essentially string like and therefore are substantially stronger in tension than compression. Compressive residual stresses in fibers allow them to buckle in situ which in turn reduces component stiffness and predisposes the reinforcing fibers to failure in bending. It will also be understood that with relatively thin components incorporating particularly reinforcing weave patterns that shrinkage can occur generally within one axis. This shrinkage may be further exacerbated by moulding pressure in the axis of shrinkage and can result in an anisotropic material performance. This is not always desirable.

In view of the above, it will be appreciated that shrinkage in the polymer matrix during curing is detrimental so that reduction in shrinkage as well as fiber buckling has advantages.

It is known that some ultraviolet curable polymers currently available have no or limited shrinkage upon stability and forming. Unfortunately, by their nature, ultraviolet curable polymers must be exposed to ultraviolet to be cured and in such circumstances formation of thicker components is therefore difficult. It will be appreciated that ultraviolet light will only penetrate to a certain depth. With regard to opaque components or components incorporating opaque fibers for reinforcement, ultraviolet curing to a significant depth through surface exposure is not possible.

SUMMARY OF THE INVENTION

In accordance with the present invention, there is provided a polymer component having an ultraviolet curable polymer and an element embedded therein to provide ultraviolet light within the component.

According to another aspect of the present invention, a method of curing an ultraviolet curable polymer in a component includes the steps of locating light transmitting elements or forming such elements within the uncured polymer components and then applying ultraviolet light to those light transmitting elements to cure the ultraviolet curable polymer as required.

According to yet another aspect of the present invention, an alternative method includes the steps of incorporating ultraviolet light source precursors within the uncured polymer and providing a stimulation mechanism either through heat, vibration or trigger light such that the precursor sources emits ultraviolet light to cure locally ultraviolet curable polymer.

DETAILED DESCRIPTION OF THE PREFERRED EMBODIMENTS

Figure 1:
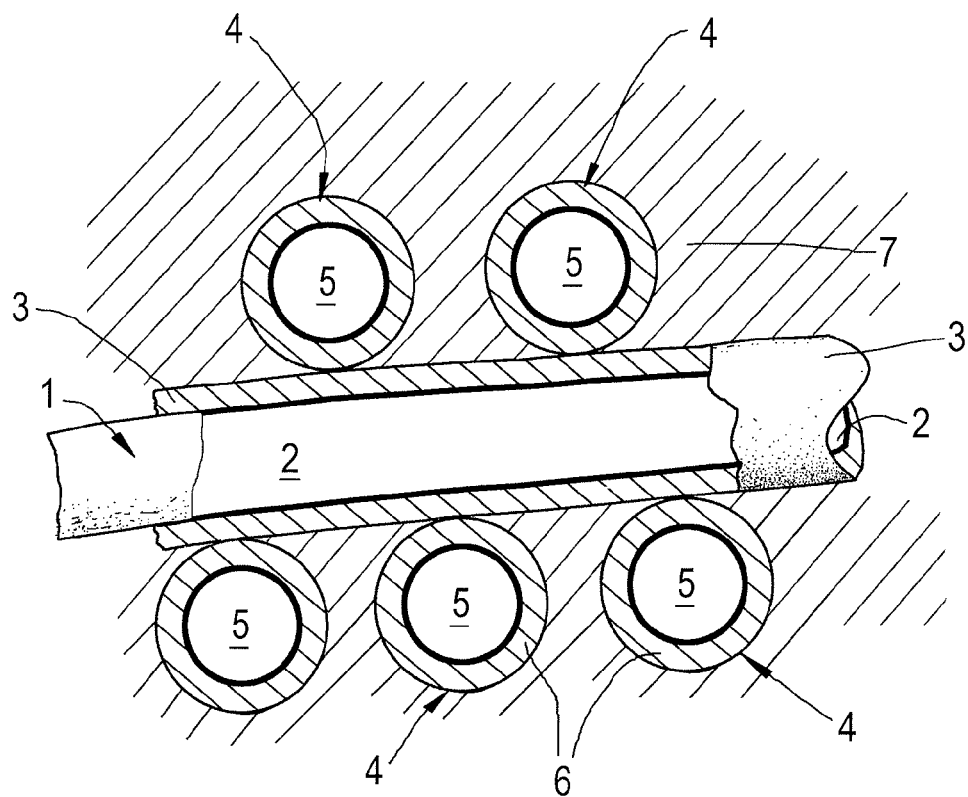
FIG. 1 is a schematic cross section of a light transmission element arrangement in accordance with the invention; and, FIG. 2 is a schematic cross section of a structurally pre-stressed light transmission element arrangement in accordance with the invention.

As indicated above, a number of ultraviolet curable polymers are available which present no or limited shrinkage upon curing. Such resins include CYRACURE™ cycloaliphatic epoxides and cationic UV-curable resins, available from The Dow Chemical Company. These ultraviolet curable polymers also have particular advantages in that no solvents are utilized or emitted during processing and so there are reduced requirements for environmental protection against such solvents. The polymers generally comprise a resin combined with an epoxy, acrylic or polyurethane base matrix or substrate. As indicated above, with thin structures and panels, ultraviolet light can be applied relatively easily through the outer surfaces of the component. Thus, for a simple weave or single braid, or for a thin structure, the light conduction of the polymer resin is adequate to assure a full cure of the thin panel component formed by the ultraviolet curable polymer.

A further advantage with regard to use of ultraviolet curable resins is that, as heat and chemical action is not required for curing, it is possible to use a wider range of the materials including low temperature materials such as plastics, visco-fiber and polypropylene within the component structure along with materials which impart particular properties such as moisture detection and/or sensing along with damping through elastic deformation. However, some of these materials may be sensitive to ultraviolet and therefore may require an ultraviolet impermeable coating or sizing to be applied to protect their function. Furthermore, in structures which are multi layered, it will be understood that relatively solid outer woven layers or otherwise are presented which are opaque to ultraviolet light then in accordance with conventional practice they will be a severe limitation with regard to ultraviolet curing of layers other than those outer layers exposed directly to ultraviolet light externally.

In accordance with the present invention, a number of solutions are presented to enable ultraviolet curable polymers to be utilized in forming polymer components and their use.

It will be appreciated that one disadvantage with some ultraviolet curable polymers is that they are continuously cured by ambient ultraviolet emissions and therefore can eventually become over cured and brittle. Solutions in accordance with aspect of the present invention enable utilization of a low temperature less aggressive curing procedures with ultraviolet curable polymers whilst maintaining adequate control of the component structure post formation.

A first solution is to provide light transmitting elements and normally a large number of such elements within a structure of a polymer component. The light transmitting elements will typically be part of the reinforcing structure for that component but nevertheless will generally reduce the ratio of high strength reinforcing fibers within the polymer component. In accordance with the present invention, the light transmitting elements may incorporate light transmitting fillers within the curable polymer itself along with chopped light transmitting elements. In such circumstances, the number of continuous light transmitting elements required may reduce due to the distributive nature of the light transmitting fillers and typically randomly orientated chopped light transmitting fibers.

It will be appreciated that it is transmission of ultraviolet light into the depths of the polymer component, which is a particular requirement. In such circumstances, in accordance with the present invention, light transmitting elements are presented as pins or strands, which extend with a vertical aspect into the depth of the polymer component. The transmitting elements act as light distribution mechanisms to the interior of the component to precipitate ultraviolet curing of ultraviolet curing polymers. These pins may take the form of staples or a stitched fiber extending through the depth of the component. These pins may also perform the structural 'Z'-pinning of the fiber layers.

In the field of optics generally, it is known to use hollow optical fibers. It is known that such fibers have greater flexibility and consequently tighter bend radii are possible. Cores of optical glass or of other materials may be inserted into the hollow interior of such fibers.

Light distribution may be further enhanced by including notches, indents, ridges or surface gratings in the pins or light transmitting elements to act as distribution exit points for light into the component to cure adjacent polymer. In the field of optical measurement, it is known to use gratings or ridges as part of an optical measurement system.

A conventional form of light transmitting element is an optic fiber. Such optic fibers typically comprise various grades of refractivity across the width of the optic fiber. In such circumstances, light can be transmitted along the fiber. A particular benefit with regard to the present invention is that optic fibers have great flexibility and the ability to achieve tight bend radii (compared to, say, a carbon fiber).

With regard to optic fibers configured to act as light transmitting elements in accordance with the present invention, it will be appreciated that consideration will be made as to the best ultraviolet light frequency for curing the ultraviolet curable resin polymer. In such circumstance, the appropriate core can be chosen for the optic fiber to deliver preferentially the best ultraviolet light frequency for curing of the particular polymer.

A particular advantage with regard to optic fibers is that when squashed or bent some of the transmitted light will escape through the refractive index shielding. In such circumstances, localised distribution and concentration of ultraviolet light can be achieved. Furthermore, the ultraviolet light transfer from the optical fiber can be varied as the light transmitting element is tightly bent. A designer of a polymer component in such circumstances can therefore incorporate structural and substantially fixed light distribution by adopting an appropriate structural weave of light transmitting elements which will include fixed structural tight bends at locations where curing is required. Furthermore, in order to achieve specific localised enhancement of curing the light transmitting elements may be arranged such that specific squashing and bending of the component can be achieved such that ultraviolet light passing along the light transmitting element can be arranged to leak from the light transmitting element and therefore enhance specifically curing at that location.

As indicated above, incorporation of specific light transmitting elements in order to enhance ultraviolet curing can be detrimental in reducing the proportion and ratio of high strength reinforcing fibers within a polymer component. Such reductions in reinforcement may be significant and unacceptable. In such circumstances, in accordance with a second solution, the reinforcing fibers such as carbon fibers can be adapted to act as light pipes. For example, carbon fibers can be coated with nylon to allow them to be manipulated without fracturing and reduce flaking. It will also be understood that such coating allows tighter bending of the reinforcing carbon fibers without compromising integrity. In accordance with the present invention, reinforcing fibers such as carbon fibers are also coated with a light transmitting material such that effectively a light transmitting sheath is provide to the reinforcing fiber. This sheath may be coated itself with a further layer of material with a different refractive index such that the light transmitting material is sandwiched to create an optical pipe for light transmission. In such circumstances, as with an optical fiber, ultraviolet light can be passed along the light transmitting material coating or sheath of the reinforcing fiber and distributed as necessary in order to stimulate ultraviolet curing in the ultraviolet curable resin or polymer. It will be appreciated that the outer coating in order to create the optic light pipe may be required if the refractive index of the base polymer component is too close to that of the reinforcing fiber and light transmitting material such that light transmission will not occur.

As indicated above, light transmitting elements themselves can be incorporated within the polymer component but such an approach may reduce the functionality of other reinforcing fibers, etc. The second solution is to adapt the reinforcing fibers to act as light pipes for transmission but such adaptation of the reinforcing fibers may again diminish effectiveness of those fibers or reduce the capability of the light transmitting elements to an impractical extent. A further third solution is therefore to provide through consideration of a refractive index of the uncured and cured polymer effective paths for light distribution.

It will be appreciated that as a polymer cures its refractive index varies. In such circumstances, and as is known with regard to forming optic fibers, it is possible to change the refractive index of materials by varying the phosphor and epoxy content or for silicon/quartz fibers by varying the type or degree of doping within the fiber. In accordance with third, the present invention already cured polymer resin can be used as cladding for an optical path for light transmission. In such circumstances, the cured polymer provides two functions, one is to direct curing and the other is to provide an indication as to the intensity of curing through monitoring when light at full intensity arrives at the far end of the light transmission component indicating complete curing to a desired level. In such circumstances, a light transmitting element can be created within the polymer or more typically a light transmission path can be coated with an ultraviolet curable resin which is then cured to a desired extent and to achieve a particular refractive index. The component is thereby "built" up as required. In such circumstances, a cured or partially cured coating will continue to cure with the light passing along the light transmission element. The coating to the transmission element may be deliberately masked to prevent light escaping at certain positions or an otherwise fully opaque coated fiber may have areas cleared of opaque sheathing so that localised areas of the polymer can be activated or not activated as they are cured.

It will also be understood that where light transmitting elements touch, mating together with surface finishes and surface coatings will determine a degree of light transfer between the light transmitting elements. Such mating together may be used to facilitate ultraviolet light distribution.

In the above circumstances by a combination of one or more of the three solutions, as outlined above, a light transmission element structure can be located within a polymer component to allow universal or localised specific curing of an ultraviolet curable polymer to a desired level in a component.

A fourth approach or solution to trigger ultraviolet curing is to provide within the uncured polymer component an ultraviolet light source precursor. This ultraviolet light source precursor will be triggered by an appropriate stimulation mechanism in order to emit ultraviolet light when required. The ultraviolet light source precursor will be associated with the polymer matrix of the component during manufacture and will typically be located through a woven, knitted or braided structure within the polymer matrix at desired locations. Stimulation mechanisms may include heating or vibration but where such stimulation mechanisms are used care must be taken with respect to the ongoing use of the component. It will appreciated that a large number of components will be used in situation where there will be inherent vibration or thermal cycling which may cause further stimulation of the ultraviolet light source and so continued exposure to ultraviolet light which will further harden the ultraviolet curable polymer matrix beyond that which may be desirable. The ultraviolet light source precursor may act through an appropriate chemical reaction and this reaction as indicated may be stimulated by vibration or heat or alternatively may be triggered by initial exposure to a primary light source distributed through light transmission elements as described above. In such circumstances, relatively low intensity light transmission through the light transmission elements may stimulate and achieve higher intensity light source emissions and so enhance curing locally.

As it will be appreciated by provision of the above, approaches and embodiments enhanced and shorter curing times are provided for ultraviolet curable polymers with thicker configurations. Advantageously the light transmitting elements will be an integral part of the component structure and reinforcement of the structure. Furthermore, as the light transmitting elements can take the form of optic fibers these fibers can be utilised as embedded instrumentation sensors within the component. Alternatively, the light transmitting elements may be relatively passive once the function of curing has been achieved. Utilisation of ultraviolet curable polymers has particular advantages with regard to removing the necessity of using volatile solvents in forming polymer components. Additionally, ultraviolet light cured polymers generally remove the necessity for higher temperatures and therefore allow a wider range of sensors including sensors utilizing lower temperature materials to be incorporated within a polymer component structure.

As indicated above, inherently ultraviolet cured polymers require exposure to ultraviolet light to be cured or fully cured. In such circumstances with thicker component geometries or ultraviolet light opaque surfaces unless ultraviolet light is presented to the ultraviolet light curable polymer that polymer will remain none activated. An advantage with such an approach is that pockets or sections of the component may be left un-activated. In such circumstances provided appropriate light transmission elements can be located without detriment to the overall structural integrity of an component during manufacturing processes and these light transmission paths not used in curing during those manufacturing processes it will be possible to utilise the un-activated resin when required. Thus, should there be instances of erosion or damage the un-activated resin can be released into the damaged area and cured by ambient radiation or by specific application of ultraviolet light through the previously unused light transmission elements to repair the damaged area. It will be appreciated particularly with regard to components utilizing in aircraft that at the altitude that aircraft fly at there will be sufficient ambient ultraviolet radiation to achieve curing and stiffening.

It will be understood that in accordance with the present invention that the light transmission elements, whether specific elements in the form of optic fibers, coatings to existing reinforcing fibers or created by judicious curing to achieve refractive index grading will remain within the polymer component after manufacture. In such circumstances, paths within the component will remain and therefore may give an indication as to continuing sunlight and/or ultraviolet light intensity exposure of the component during its operational life.

The present invention incorporates a method of curing a polymer component including an ultraviolet curable polymer resin. The method includes locating light transmitting elements or forming such elements within the uncured polymer components and then applying ultraviolet light to those light transmitting elements to cure the ultraviolet curable polymer as required. A method in accordance with alternative or additional aspects of the present invention also includes incorporating ultraviolet light source precursors within the uncured polymer and providing a stimulation mechanism either through heat, vibration or trigger light such that the precursor sources emits ultraviolet light to cure locally ultraviolet curable polymer.

As indicated above with regard to certain aspects of the present invention, light transmitting elements are advantageous for transmitting ultraviolet light to interior parts of a polymer component. These light transmitting elements can be combined in order to provide a weave, knit, braid or network within the polymer component. The light transmitting elements in such circumstances may touch each other to facilitate distribution of light within the network. FIG. 1 schematically illustrates a simple cross light transmission element arrangement in which a lateral light transmission element 1 having a core 2 and sheath 3 is contacted by cross light transmission elements 4 including a respective core 5 and sheath 6. Light may be coupled between the respective light transmission elements 1, 4 to the sheaths 3, 6 and into the cores 2, 5 for distribution through a polymer matrix 7 forming a component. In such circumstances, certain light transmission elements may be designated as primary or trunk distribution elements with other transmission elements then tapping light transmission from the trunk elements as required. In such circumstances by control of primary ultraviolet light emissions into the primary trunk distribution light transmission elements selected areas of the polymer matrix 7 may be exposed to ultraviolet light for curing purposes.

Figure 2:
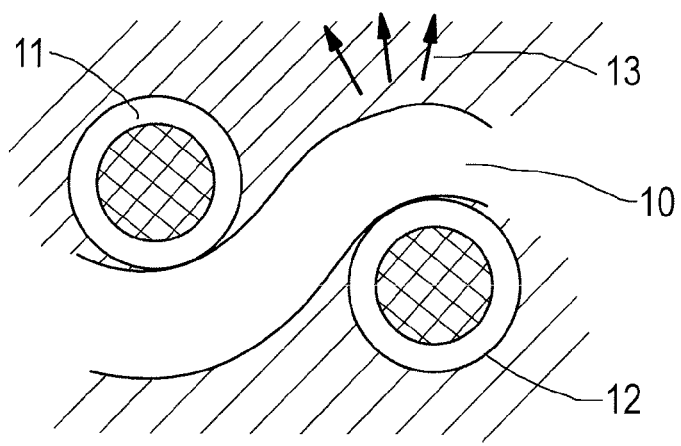

As indicated above, bending and squashing of light transmission elements and in particular optic fibers can create leakage of light. In such circumstances and as depicted in FIG. 2, a light transmission element 10 is arranged in a weave pattern with other elements, which may be light transmitting elements or reinforcing elements and fibers 11, 12. In any event, these further fibers 11, 12 cause a tight bend in the light transmission element 10 such that there is light transmission in the direction of the arrowheads 13. In such circumstances, this leaked ultraviolet light 13 will locally cure a polymer matrix in the vicinity of the bend 10 and so create localised curing as required.

It will also be understood that the aspects of the present invention described above may be combined. Thus, in-situ ultraviolet light sources may be stimulated to provide ultraviolet light to light transmission elements for appropriate distribution and curing. In such circumstances attenuation and losses of the ultraviolet light may be more easily accommodated.

Modifications and alterations to the present invention will be appreciated by those skilled in the art. Thus, for example conventionally distribution and size of the light transmitting elements will be consistent throughout the polymer component. However, alternatively, different sized in terms of diameter and curability light transmission elements may be located and distributed for specific functions throughout the polymer component to achieve enhanced or controlled localised curing depending upon requirements within the polymer component. In such circumstances, parts of the polymer component may be hardened extensively by curing whilst other parts are only partially cured to remain possibly flexible.

What is claimed is:

1. A polymer component comprising:
   an ultraviolet curable polymer; and
   a light transmitting element embedded in said polymer, the light transmitting element comprising:
      an opaque inner fiber having an outer surface; and
      an optically transmissive coating formed on the outer surface said opaque inner fiber for providing ultraviolet light within the component to cure the ultraviolet curable polymer; and
      a cladding provided by regulating the refractive index of the polymer about the light transmitting element to regulate presentation of the ultraviolet light within the component.

2. The component as claimed in claim 1 wherein the light transmitting element comprises one or more optic fibers.

3. The component as claimed in claim 1 wherein the light transmitting element is locally stressed to provide leakage of light thereabout for curing the ultraviolet curable polymer.

4. The component as claimed in claim 1 wherein the light transmitting element incorporates one or more notches, indents, ridges or gratings to facilitate distribution of ultraviolet light within the polymer component.

5. A polymer component comprising:
   an ultraviolet curable polymer; and
   a light transmitting element embedded in said polymer, the light transmitting element comprising:
      an opaque inner fiber having an outer surface;
      an optically transmissive coating formed on the outer surface of said opaque inner fiber for providing ultraviolet light within the component to cure the ultraviolet curable polymer;
      an ultraviolet light source precursor; and
      a heat or vibration mechanism to stimulate the ultraviolet light source precursor.

6. A method of curing an ultraviolet curable polymer in a component comprising the steps of:
   embedding a light transmitting element within the uncured component; the light transmitting element comprising:
      an opaque inner fiber having an outer surface; and
      an optically transmissive coating formed on the outer surface of said opaque inner fiber; and
   providing ultraviolet light from the light transmitting element to the polymer.

7. The method as claimed in claim 6 wherein the light transmitting element comprises one or more optic fibers.

8. The method as claimed in claim 6 wherein the light transmitting element is locally stressed to provide leakage of light thereabout for curing the ultraviolet curable polymer.

9. The as claimed in claim 6 wherein the light transmitting element incorporates one or more notches, indents, ridges or gratings to facilitate distribution of ultraviolet light within the polymer component.

10. The method as claimed in claim 6 wherein the source of the ultraviolet light is provided by the optically transmissive coating.

11. The method as claimed in claim 6 wherein the light transmitting element further comprises a cladding provided by regulating the refractive index of the polymer about the light transmitting element to regulate presentation of the ultraviolet light within the component.

12. The method as claimed in claim 6 wherein the light transmitting element further comprises an ultraviolet light source precursor and a heat or vibration mechanism for stimulating the ultraviolet light source precursor, the method further comprising the step of utilizing the heat or vibration mechanism to stimulate the ultraviolet light source precursor to emit ultraviolet light to the ultraviolet curable polymer to cure the ultraviolet curable polymer.

13. A polymer component comprising:
   an ultraviolet curable polymer; and
   a light transmitting element embedded in said polymer to provide ultraviolet light within the component to cure the ultraviolet curable polymer, the light transmitting element including an ultraviolet light source precursor and a heat or vibration mechanism to stimulate the ultraviolet light source precursor.

14. A method of curing an ultraviolet curable polymer in a component including the steps of:
embedding a light transmitting element within the uncured component;
providing ultraviolet light from the light transmitting element to the polymer, the light transmitting element including an ultraviolet light source precursor and a heat or vibration mechanism for stimulating the ultraviolet light source precursor; and
utilizing the heat or vibration mechanism to stimulate the ultraviolet light source precursor to emit ultraviolet light to the ultraviolet curable polymer to cure the ultraviolet curable polymer.

15. The component as claimed in claim 1 wherein the opaque inner fiber is formed from a high strength reinforcing material.

16. The component as claimed in claim 1 wherein the opaque inner fiber is formed from carbon fiber.

17. The component as claimed in claim 1 wherein the light transmitting element further comprises a cladding provided around the outside of the optically transmissive coating.

18. The component as claimed in claim 17 wherein the cladding is stressed, notched, indented, ridged or grated to provide or facilitate leakage of light thereabout for facilitating distribution of ultraviolet light within the polymer component.

19. The method as claimed in claim 6 wherein the opaque inner fiber is formed from a high strength reinforcing material.

20. The method as claimed in claim 6 wherein the opaque inner fiber is formed from carbon fiber.

21. The method as claimed in claim 6 wherein the light transmitting element further comprises a cladding provided around the outside of the optically transmissive coating.

22. The method as claimed in claim 21 wherein the cladding is stressed, notched, indented, ridged or grated to provide or facilitate leakage of light thereabout for facilitating distribution of ultraviolet light within the polymer component.

* * * * *